(12) United States Patent
Kao et al.

(10) Patent No.: US 10,805,543 B2
(45) Date of Patent: Oct. 13, 2020

(54) DISPLAY METHOD, SYSTEM AND COMPUTER-READABLE RECORDING MEDIUM THEREOF

(71) Applicant: Wistron Corporation, New Taipei (TW)

(72) Inventors: Meng-Chao Kao, New Taipei (TW);
Hui-Chen Lin, New Taipei (TW);
Jie-Ci Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 134 days.

(21) Appl. No.: 15/414,625

(22) Filed: Jan. 25, 2017

(65) Prior Publication Data

US 2018/0115717 A1 Apr. 26, 2018

(30) Foreign Application Priority Data

Oct. 26, 2016 (TW) .............................. 105134489 A

(51) Int. Cl.
*G06T 7/194* (2017.01)
*G06T 7/50* (2017.01)
(Continued)

(52) U.S. Cl.
CPC ..... *H04N 5/23293* (2013.01); *G06K 9/00268* (2013.01); *G06T 5/006* (2013.01);
(Continued)

(58) Field of Classification Search
CPC ................................................. G06Q 30/0643
See application file for complete search history.

(56) References Cited

U.S. PATENT DOCUMENTS 6,005,611 A 12/1999 Gullichsen et al.
6,987,535 B1 1/2006 Matsugu et al.
(Continued)

FOREIGN PATENT DOCUMENTS

CN 102201099 9/2011
CN 105210093 12/2015

OTHER PUBLICATIONS

Socratic Q&A URL: https://socratic.org/questions/a-person-1-80-m-tall-stands-in-front-of-a-plane-mirror-what-is-the-minimum-heigh (Year: 2014).*

(Continued)

*Primary Examiner* — Clifford Hilaire
(74) *Attorney, Agent, or Firm* — JCIPRNET

(57) ABSTRACT

A display method, a system and a computer-readable recording medium thereof are provided, where the method includes the following steps. An image of a user in front of a screen is captured by using an image capturing device to generate a user image. A foreground region and a background region in the user image are distinguished by using a depth sensor. A virtual window is set on a display area of the screen according to its display size. Human face detection is performed on the foreground region to obtain plane information of the human face, and depth information of the human face is obtained by using the depth sensor. A background image is generated based on the background region according to the virtual window, the plane information and the depth information of the human face. The foreground region is combined with the background image to generate an output image.

20 Claims, 8 Drawing Sheets

(51) Int. Cl.
*G06T 7/11* (2017.01)
*G06T 7/70* (2017.01)
*H04N 5/232* (2006.01)
*H04N 5/217* (2011.01)
*H04N 5/222* (2006.01)
*H04N 5/357* (2011.01)
*G06K 9/00* (2006.01)
*G06T 5/00* (2006.01)
*G06T 7/60* (2017.01)
*G06T 11/60* (2006.01)

(52) U.S. Cl.
CPC ............... *G06T 7/11* (2017.01); *G06T 7/194* (2017.01); *G06T 7/50* (2017.01); *G06T 7/60* (2013.01); *G06T 7/70* (2017.01); *G06T 11/60* (2013.01); *H04N 5/217* (2013.01); *H04N 5/2226* (2013.01); *H04N 5/23219* (2013.01); *H04N 5/23238* (2013.01); *H04N 5/3572* (2013.01); *G06T 2207/10028* (2013.01); *G06T 2207/20221* (2013.01); *G06T 2207/30201* (2013.01)

(56) References Cited

U.S. PATENT DOCUMENTS

| | | | |
|---|---|---|---|
| 7,868,922 B2 | 1/2011 | Ciuc et al. | |
| 9,098,873 B2 | 8/2015 | Geisner et al. | |
| 2010/0197390 A1* | 8/2010 | Craig | G06K 9/00369 463/30 |
| 2011/0246329 A1* | 10/2011 | Geisner | G06F 3/017 705/27.1 |
| 2013/0229482 A1* | 9/2013 | Vilcovsky | H04N 7/144 348/14.07 |
| 2016/0280136 A1* | 9/2016 | Besson | B60R 1/00 |

OTHER PUBLICATIONS

"Office Action of Taiwan Counterpart Application," dated Jul. 27, 2017, with English translation thereof, p. 1-p. 11, in which the listed references were cited.

"Office Action of China Counterpart Application", dated May 28, 2020, p. 1-p. 8.

* cited by examiner

DISPLAY METHOD, SYSTEM AND COMPUTER-READABLE RECORDING MEDIUM THEREOF

CROSS-REFERENCE TO RELATED APPLICATION

This application claims the priority benefit of Taiwan application serial no. 105134489, filed on Oct. 26, 2016. The entirety of the above-mentioned patent application is hereby incorporated by reference herein and made a part of this specification.

TECHNICAL FIELD

The disclosure relates to a display technique, in particular to, a display method, a system and a computer-readable recording medium thereof.

BACKGROUND

As information technology has been incorporated into many aspects in our daily life, a significant trend has been towards the development of smart products. The existing products are not only provided with digital features, but also bundled with user interfaces to optimize life experiences for the users. For example, a mirror, as a daily essential, has been developed to a mirror display with mirroring and displaying features, where its mirror plane is configured as a reflection plane, and its display plane is configured to display text and graphic information. The target market of such mirror display has been focusing on barber shops, optician stores, apparel stores, and so forth.

In general, the mirror display is configured by coating reflective substance on a transparent panel in front of a display or by adding an additional transparent panel coated with reflective substance. However, there exists a trade-off between reflectance and transmittance. The intensity of transmission light with the display feature would be reduced with over 30% loss due to the reflective substance at the front. On the other hand, reflective light with the mirroring feature would not function as an ordinary mirror since the reflectivity does not normally exceed 50%. Moreover, the transmission light and the reflective light may present simultaneously and interfere with each other and thereby create confusion in visual representations.

SUMMARY OF THE DISCLOSURE

Accordingly, a display method, a system and a computer-readable recording medium thereof are provided, where an image is calculated and simulated as if it were reflected from a mirror through a use of an image capturing device and a depth sensor so that the image displayed on a screen may attain a mirror effect.

According to one of the exemplary embodiments, the display method is adapted to a display system having an image capturing device, a depth sensor, and a screen and includes the following steps. An image of a user in front of the screen is captured by using the image capturing device to generate a user image. A foreground region and a background region in the user image are distinguished by using the depth sensor. A virtual window is set on a display area of the screen according to its display size. Human face detection is performed on the foreground region to obtain plane information of the human face, and depth information of the human face is obtained by using the depth sensor. A background image is generated based on the background region according to the virtual window, the plane information and the depth information of the human face. The foreground region is combined with the background image to generate an output image.

According to one of the exemplary embodiments, the display system includes an image capturing device, a depth sensor, a screen, a memory, and a processor. The processor is coupled to the image capturing device, the depth sensor, the screen, and the memory, and the image capturing device and the depth sensor are disposed at a same side as the screen. The image capturing device is configured to capture images. The depth sensor is configured to detect depth information. The screen is configured to display images. The memory is configured to store data. The processor is configured to capture an image of a user in front of a screen by using the image capturing device to generate a user image, distinguish a foreground region from a background region in the user image by using the depth sensor, set a virtual window on a display area of the screen according to a display size thereof, perform human face detection on the foreground region to obtain plane information of a human face position of the user, obtain depth information of the human face position by using the depth sensor, generate a background image based on the background region according to the virtual window, the plane information and the depth information of the human face position, combine the foreground region with the background image to generate an output image, and display the output image on the screen.

According to one of exemplary embodiments, the computer-readable recording medium records computer program to execute the steps of the aforementioned display method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
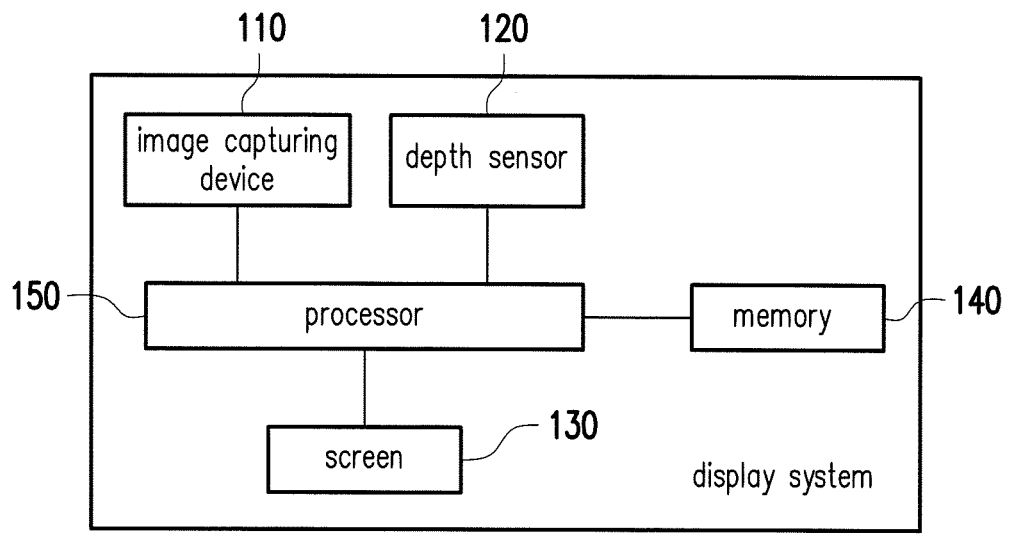
FIG. 1 illustrates a block diagram of a proposed display system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed display system in accordance with one of the exemplary embodiments of the disclosure. All components of the display system and their configurations are first introduced in FIG. 1. The functionalities of the components are disclosed in more detail in conjunction with FIG. 2.

Referring to FIG. 1, a display system 100 includes an image capturing device 110, a depth sensor 120, a screen 130, a memory 140, and a processor 150. The processor 150 is coupled to the image capturing device 100, the depth sensor 120, the screen 130, and the memory 140. The image capturing device 110 and the depth sensor 120 are disposed on the same side as the screen 130. In the present exemplary embodiment, all the aforementioned components may be integrated in the display system 100 as an all-in-one device. In another exemplary embodiment, the display system 100 may be a computer system having the screen 130, the memory 140, and the processor 150 with the externally-connected image capturing device 110 and depth sensor 120. Yet in another exemplary embodiment, the display system 100 may also be an electronic device provided with image capturing and displaying features such as a smart phone, a tabular computer, and so forth. The disclosure is not limited in this regard.

The image capturing device 110 is configured to capture images in front of the screen 130 and includes a camera lens having an optical lens and a sensing element. The sensing element is configured to sense intensity entering the optical lens to thereby generate images. The sensing element may be, for example, charge-coupled-device (CCD) elements, complementary metal-oxide semiconductor (CMOS) elements. The disclosure is not limited in this regard.

The depth sensor 120 is configured to detect depth information in front of the screen 130 and may be categorized into an active depth sensor and a passive depth sensor. The active depth sensor may calculate the depth information in front of the screen 130 by actively transmit signals such as light source, ultrasound, laser, and so forth. On the other hand, the passive depth sensor may be, for example, another image capturing device which captures another image in front of the screen 130 from a different viewing angle simultaneously with the image capturing device 110. The two images captured by the two image capturing devices may be used for calculate the depth information in front of the screen 130.

The screen 130 is configured to display images for the user to view. In the present exemplary embodiment, the screen 130 may be a liquid crystal display (LCD), a light-emitting diode (LED) display, an organic light-emitting diode (OLED) display, a field emission display (FED), or other types of displays.

The memory 140 is configured to store data such as images and programming codes and may one or a combination of a stationary or mobile random access memory (RAM), a read-only memory (ROM), a flash memory, a hard drive, other similar devices or integrated circuits.

The processor 150 is configured to control the operation among the components of the display system 100 and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices or a combination of aforementioned devices.

Detailed steps of how the display system 100 performs its display method would be illustrated along with each component hereafter.

Figure 2:
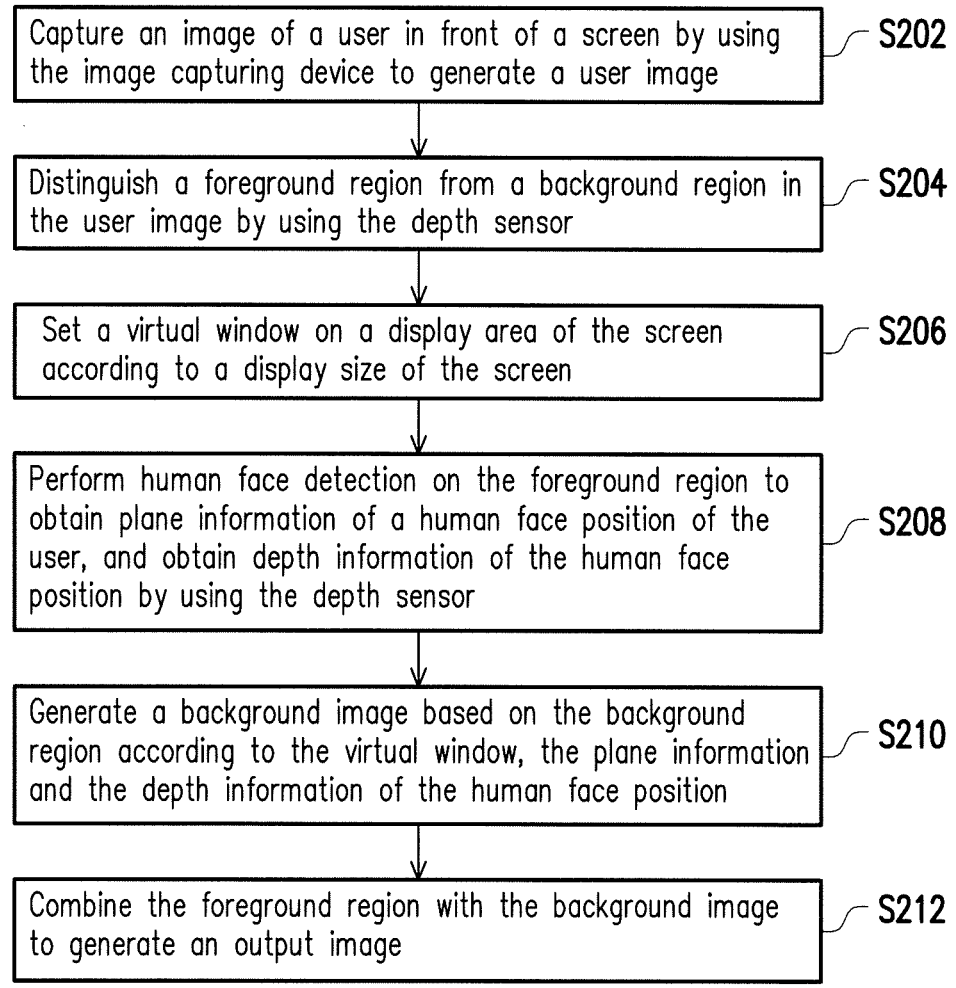
FIG. 2 illustrates a flowchart of a proposed display method in accordance with one of the exemplary embodiments of the disclosure.

FIG. 2 illustrates a flowchart of a proposed display method in accordance with one of the exemplary embodiments of the disclosure.

Figure 3:
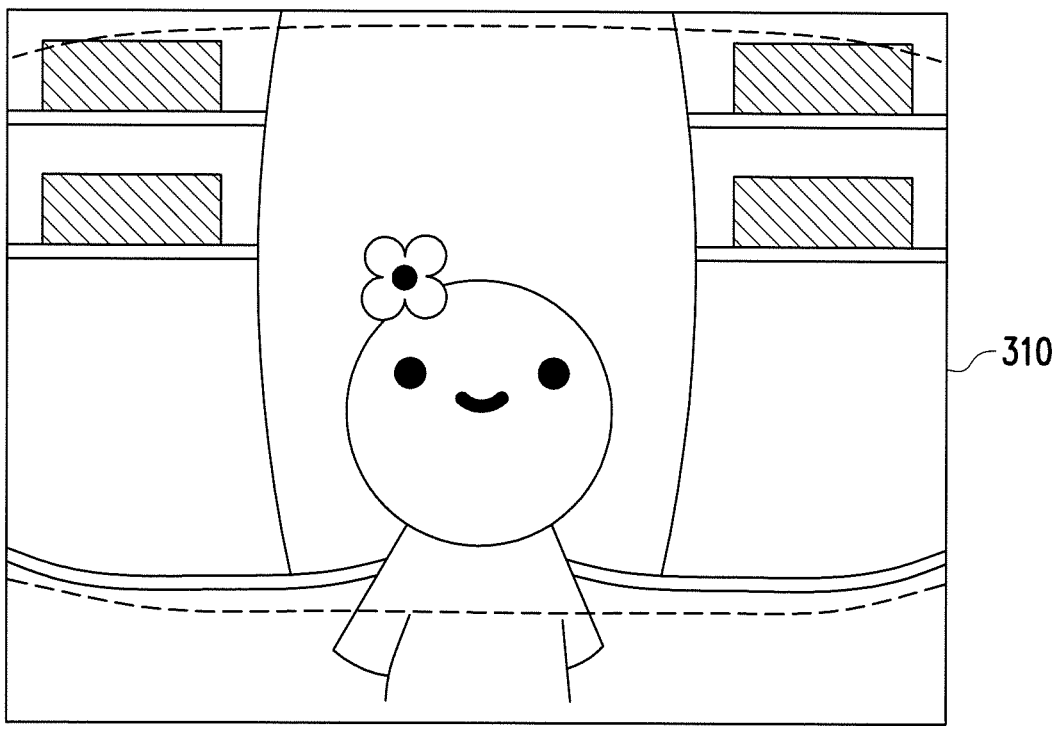
FIG. 3 illustrates an image captured by an image capturing device and an image after lens distortion rectification in accordance with one of the exemplary embodiments of the disclosure.
Figure 3:
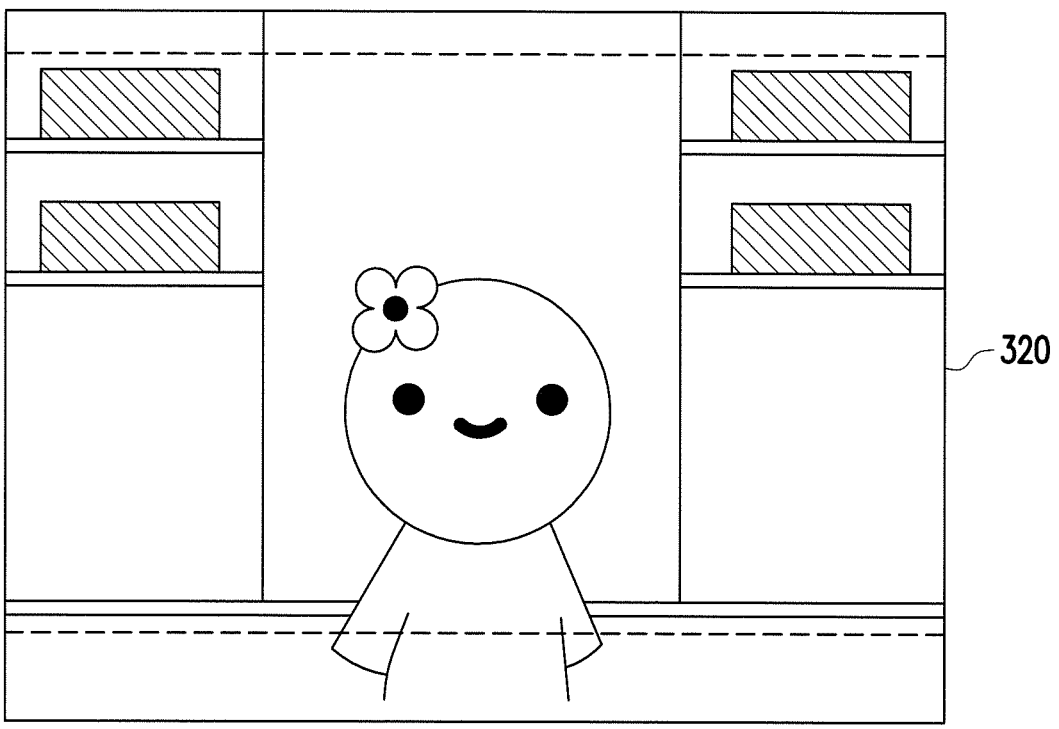

Referring to both FIG. 1 and FIG. 2, the processor 150 of the display system 100 would first capture an image of the user in front of the screen 130 by using the image capturing device 110 to generate a user image (Step S202). To be specific, in order to simulate an image as if it were reflected from a mirror, the image capturing device 110 may be, for example, disposed at the center on top of the display area of the screen 130 to capture the image of the user in front of the screen 130. In the present exemplary embodiment, since a mirror image viewed by the user varies due to his viewing position, the image capturing device 110 may use a wide angle lens to capture sufficient background image information. However, the processor 150 may first perform image pre-processing, such as lens distortion rectification, on the image captured by the image capturing device 110 to correct barrel distortion and pincushion distortion caused by the wide angle lens so that an output image would be presented with natural effects later on. The lens distortion rectification herein may be metric rectification using intrinsic parameters and extrinsic parameters of a camera model or non-metric rectification using, for example, multinomial curve fitting algorithms. The disclosure is not limited in this regard. Take an image 310 captured by the image capturing device 110 and an image 320 after lens distortion rectification as illustrated in FIG. 3 in accordance with one of the exemplary embodiments as examples, objects at the edges in the image 310 would be extended and magnified that cause distortion. After the image 310 is rectified, the rectified image 320 would have a natural wide-angle effect.

Figure 4:
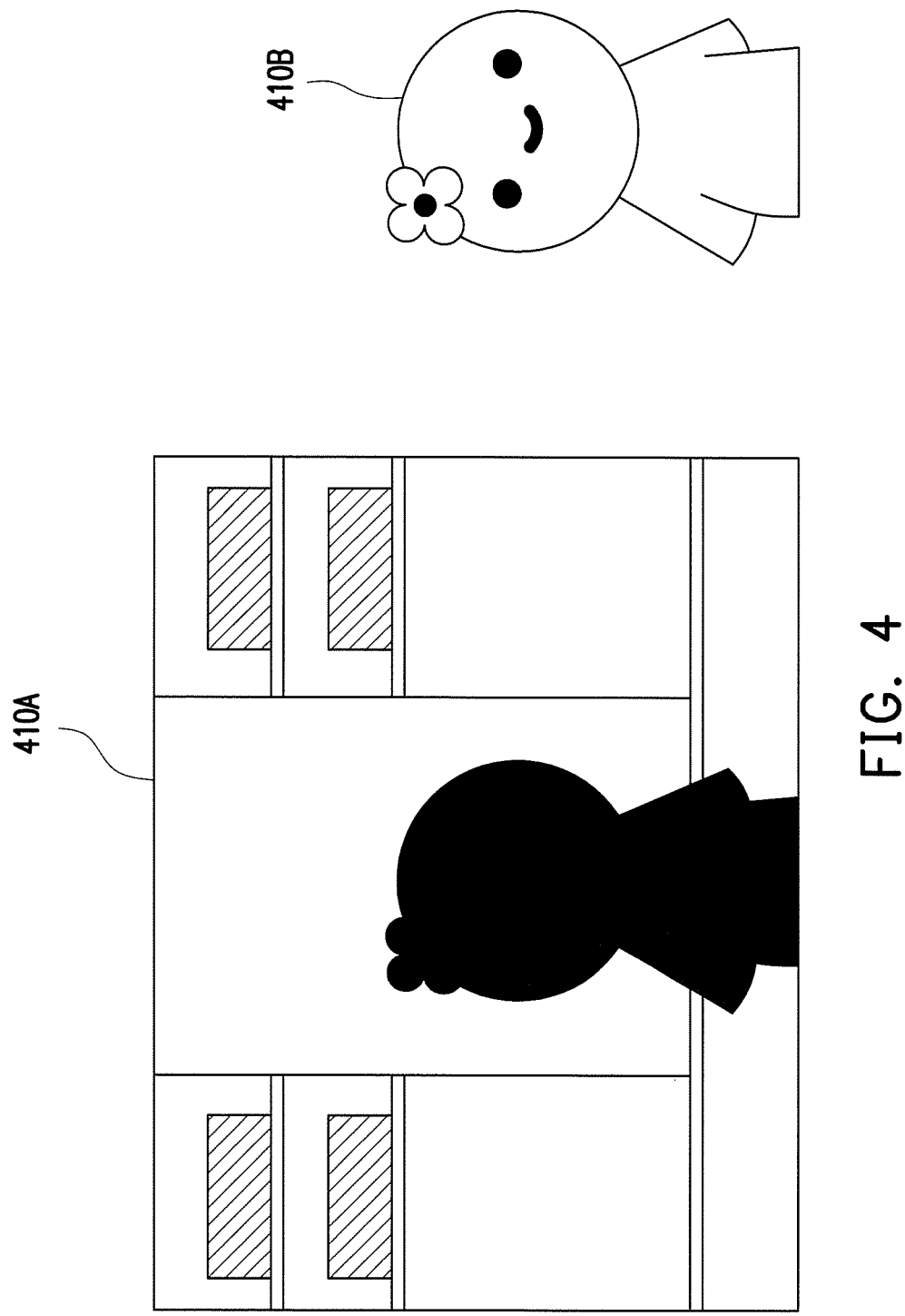
FIG. 4 illustrates a foreground region and a background region in accordance with one of the exemplary embodiments of the disclosure.

Revisiting FIG. 2, the processor 150 of the display system 100 would distinguish a foreground region from a background region in the user image by using the depth sensor 120 (Step S204). To be specific, the depth sensor 120 would detect depth information in front of the screen 130, and the processor 150 would associate the detected depth information in front of the screen 130 detected by the depth sensor 120 with each pixel of an image in front of the screen 130 captured by the image capturing device 110 so as to obtain depth information corresponding to each pixel in the user image. Next, the processor 150 would compare the depth information corresponding to each of the pixels and a predefined depth threshold stored in the memory 140 so as to accordingly determine whether each of the pixels belongs to the background region or the foreground region. For example, FIG. 4 illustrates a foreground region 410A and a background region 410B segmented from a user, where the foreground region 410A includes a main subject.

In the present embodiment, assume that the depth information detected by the depth sensor 120 is a depth distance, and the predefined depth threshold may be 1.5 m. When the depth distance of any pixel is greater than 1.5 m, the processor 150 would determine that such pixel belongs to the background region. When the depth distance by any pixel is not greater than 1.5 m, the processor 150 would determine that such pixel belongs to the foreground region. In another exemplary embodiment, assume that the depth information detected by the depth sensor 120 is quantized as an 8-bit grayscale, and the predetermined depth threshold may be 85. When the depth grayscale of any pixel is greater than 85, the processor 150 would determine that such pixel belongs to the foreground region. When the depth grayscale by any pixel is not greater than 85, the processor 150 would determine that such pixel belongs to the background region.

Revisiting FIG. 2, since the vision of the image capturing device 110 is on the screen 130 which is different from human vision, the processor 150 of the display system 100 would set a virtual window on a display area of the screen 130 according to a display size of the screen 130 (Step S206), where the virtual window would be set such that an image presenting on the screen 130 later on would be the same size as an image reflected from an ordinary mirror, and the screen 130 would act as a mirror. In the present exemplary embodiment, there exists a scaling ratio between the display sizes of the virtual window and the screen 130. Since the display size of the screen 130 is constant, the settings of the virtual window may be stored in the memory 140 during manufacturing. The ways to set the virtual window would be illustrated hereafter.

Figure 5:
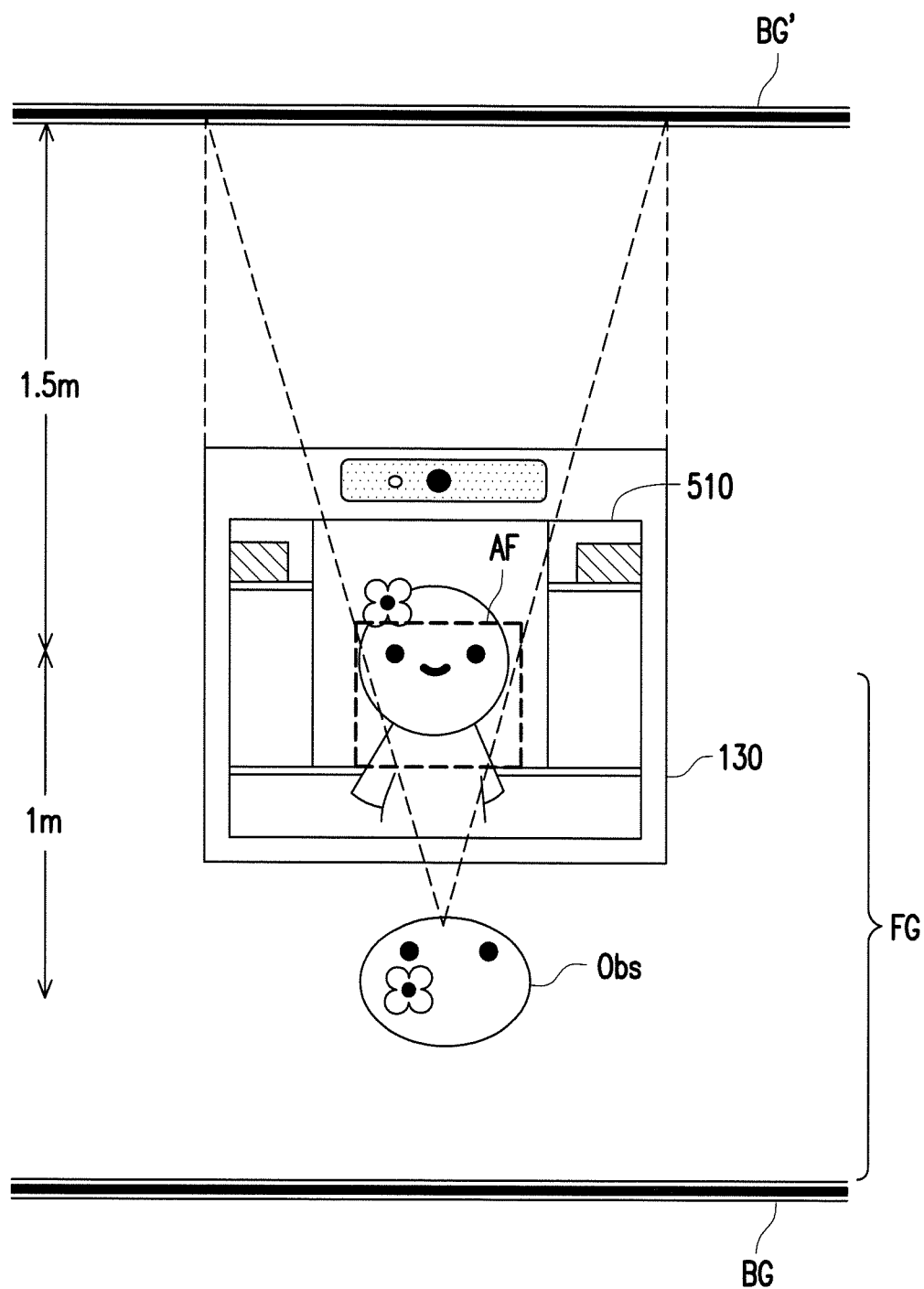
FIG. 5 illustrates a schematic diagram of a way to set a virtual window in accordance with one of the exemplary embodiments of the disclosure.

FIG. 5 illustrates a schematic diagram of a way to set a virtual window in accordance with one of the exemplary embodiments of the disclosure.

Referring to FIG. 5, assume that a region more than 1.5 m away from the front of the screen 130 is considered as a background BG, and assume that a region no more than 1.5 m away from the front of the screen 130 is considered as a foreground FG. Herein, 1.5 m away and behind the screen 130 is defined as an imaging position of the background BG (i.e. a mirror image BG'). Assume that an optimal viewing position of a user Obs is 1 m away from the front of the screen 130. Therefore, the length and the width of a virtual window AF are respectively 0.4 times of those of the screen 130 (i.e. the scaling ratio, $$\frac{1}{1+1.5} = 0.4).$$

In other words, the size of the virtual window AF may be obtained according to the display size of the screen 130 as well as the scaling ratio calculated based on the optimal viewing position and the imaging position of the background.

It should be noted that, the optimal viewing position may be referred to as a position with the optimal viewing effect as if the user is looking at a mirror with the same display size as the screen 130. For example, the optimal viewing position for a full-length mirror is 1.5 m in front thereof, and the optimal viewing position for a makeup mirror is 30 cm in front thereof. However, in other exemplary embodiments, the display system 100 may also provide an interface to allow the user to manually adjust the optimal viewing position for his need and habit. Moreover, the display system 100 may also provide an interface to allow the user to manually adjust other settings of the virtual window for different effects. The disclosure is not limited in this regard.

Revisiting FIG. 2, since image contents reflected from the mirror plane and viewed by the user are different due to his spatial position, the processor 150 of the display system 100 would perform human face detection on the foreground region to obtain plane information of a human face position of the user and obtain depth information of the human face position by using the depth sensor 120 (Step S208). The processor 150 may detect horizontal coordinates of the human face from the foreground region by leveraging any human face recognition algorithm and then obtain the depth information of the human face to locate its actual spatial position. In the present embodiment, the center of a line between two eyes may be the spatial position of the human face.

Next, the processor 150 of the display system 100 would generate a background image based on the background region according to the virtual window, the plane information and the depth information of the human face position (Step S210). To be specific, while the user is getting closer to a mirror, a background region with a wider range and a foreground region with a larger area would be presented in a mirror image from his viewing angle. Hence, after the processor 150 obtains the human face position, it would estimate the size and the imaging position of the background region within the user's vision according to the position at which the virtual window is located on the screen 130 (referred to as "visual background calculation") to simulate a mirror effect as opposed to an ordinary image capturing device which only presents a fixed background. In the present embodiment, the processor 150 would select a background mirror image region from the background region according to the size of the virtual window as well as the plane information and the depth information of the human face position to generate the background image. Herein the processor 150 may calculate a range projected from the human face position, passing through two horizontal endpoints of the virtual window, to a mirror image of the background so as to accordingly select the background mirror image region from the background region. Next, the processor 150 would combine the foreground region with the background image to generate an output image (Step S212) and display the output image on the screen 130. Herein, the processor 150 would adjust the size of the combined image to fit the display area of the screen to generate the output image.

Figure 6:
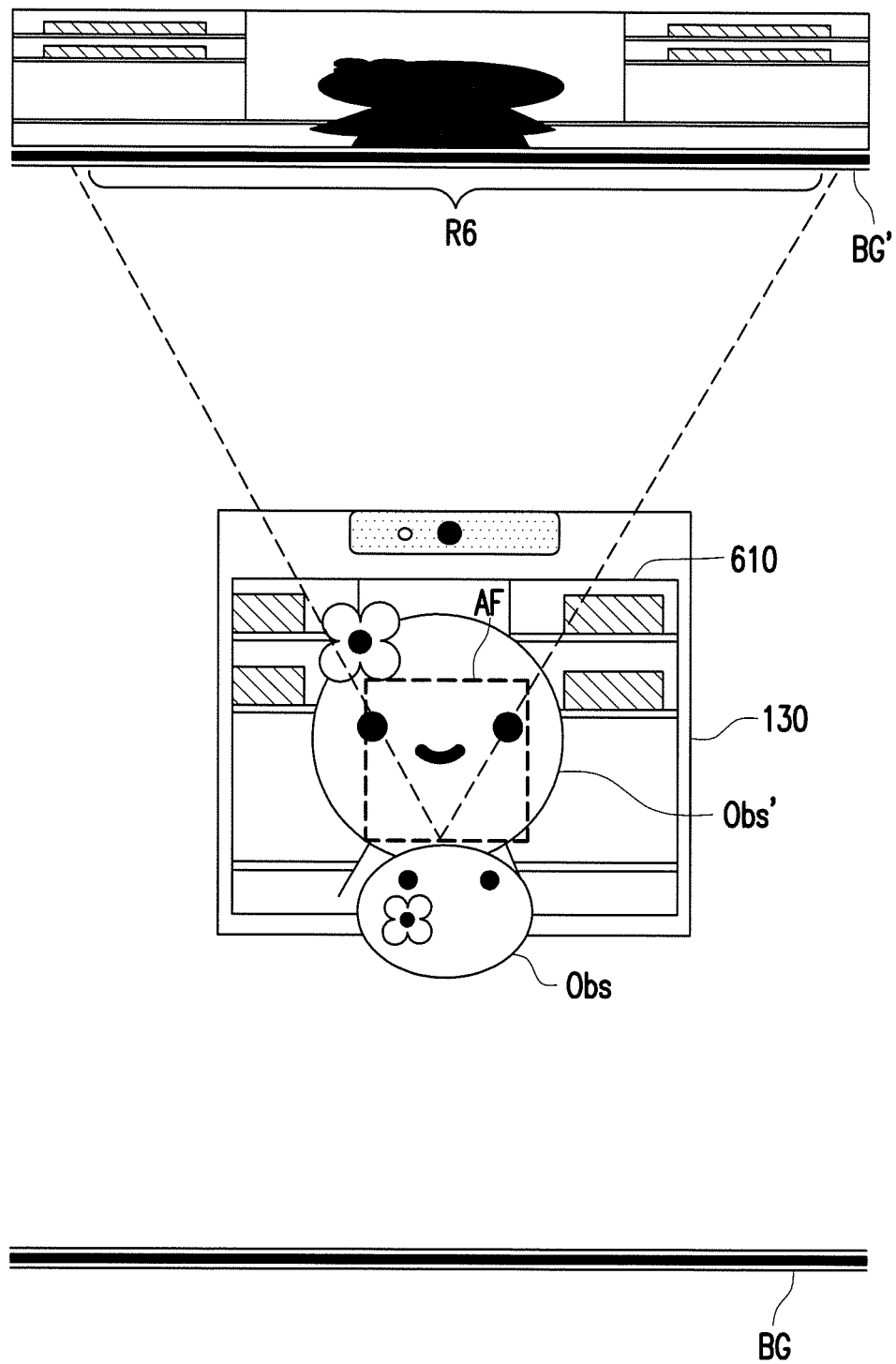
FIG. 6 illustrates a schematic diagram of a display method in accordance with one of the exemplary embodiments of the disclosure.
Figure 7:
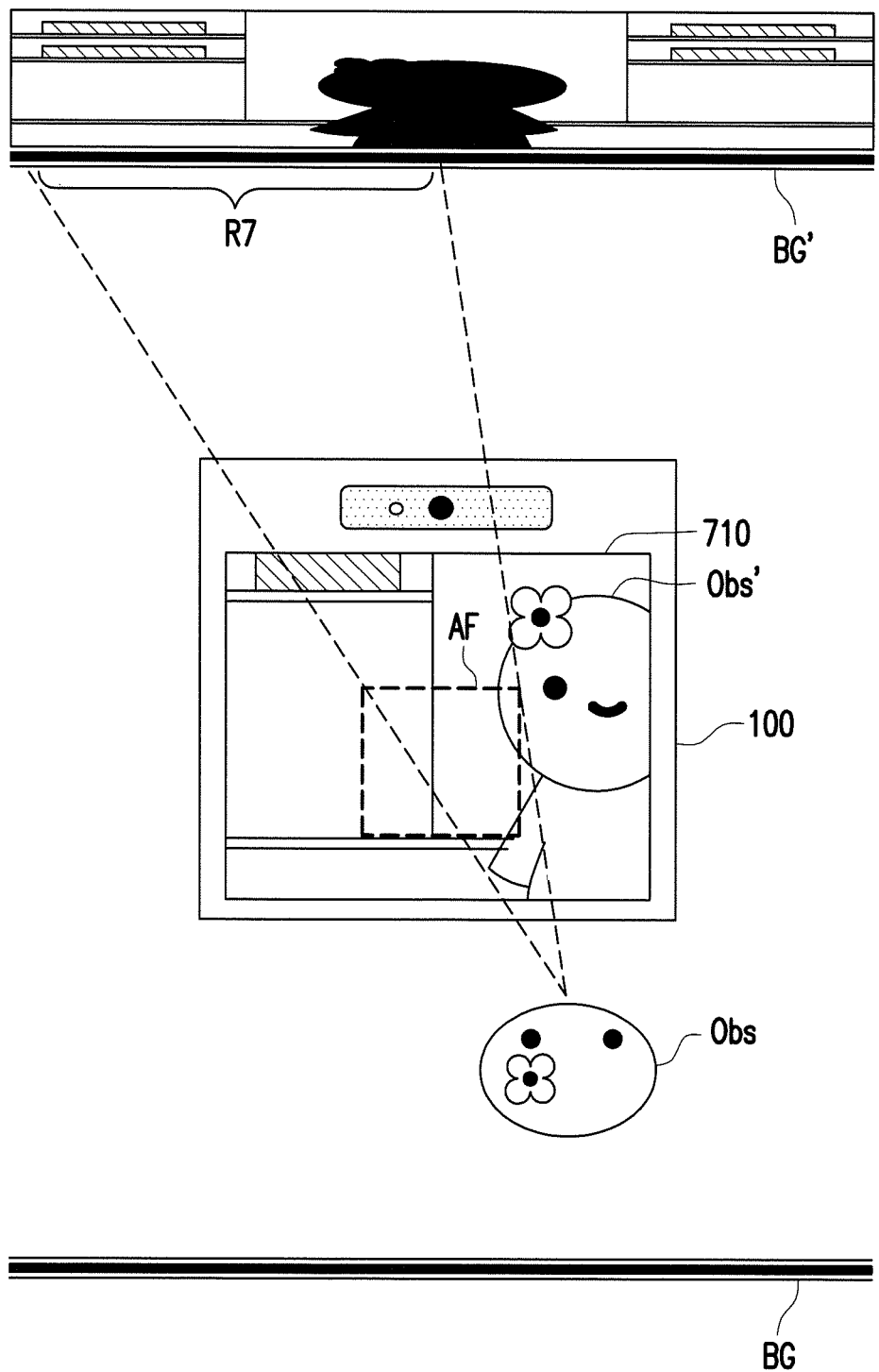
FIG. 7 illustrates a schematic diagram of a display method in accordance with one of the exemplary embodiments of the disclosure.

For example, FIG. 6 and FIG. 7 illustrate schematic diagrams of a display method in accordance with one of the exemplary embodiments of the disclosure.

Referring to FIG. 6, while the user Obs is getting closer to the screen 130, a range R6 of a mirror image BG' of a background BG would be projected through a virtual window AF from his viewing angle. The processor 150 would set a region corresponding to a background region within the range R6 (i.e. the aforementioned background mirror image region) as a background image, combine a foreground region (i.e. a display image Obs' of the user Obs) with the background image, and generate a display image 610 with a large main subject and a wide range of background.

Next referring to FIG. 7, while the user Obs is viewing from the right-hand side of the screen 130, a range R7 of the mirror image BG' of the background BG would be projected through the virtual window AF from his viewing angle. The processor 150 would set a region corresponding to a background region within the range R7 (i.e. the aforementioned background mirror image region) as a background image, combine a foreground region (i.e. the display image Obs' of the user Obs) with the background image, and generate a display image 710 having a background region which is at the left-hand side of the user Obs.

It should be noted that, in an exemplary embodiment, multiple virtual backgrounds could be prestored in the memory 140 as an alternative placement of a background region. The processor 150 would also perform visual background calculation on a virtual background according to a virtual window, plane information and depth information of a human face position to generate a background image, and combine the foreground region with the background image. To be specific, FIG. 8 illustrates a schematic diagram of a display method in accordance with one of the exemplary embodiments of the disclosure.

Figure 8:
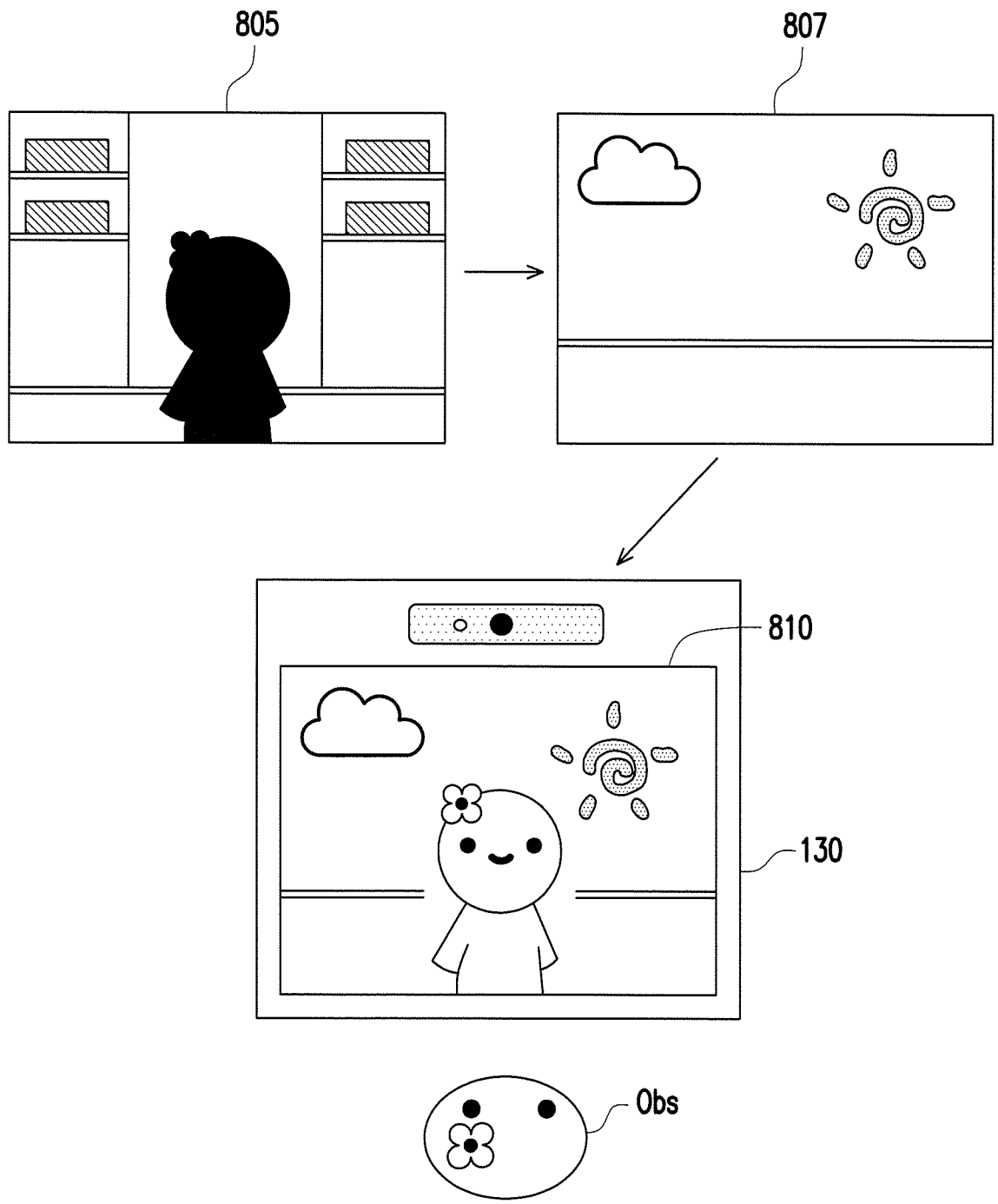
FIG. 8 illustrates a schematic diagram of a display method in accordance with one of the exemplary embodiments of the disclosure.

Referring to both FIG. 1 and FIG. 8, the processor 150 would replace a background region 805 segmented from a user image by a virtual background 807 to generate a background image, and then combine a foreground region with such background image into an output frame 810 to be displayed on the screen 130 so as to attain a virtual magical mirror effect.

Additionally, the processor 150 could display more display information, such as texts, pictures, on the screen 130 to provide more features. Since the output image is a simulated reflective image, which is considered as known information for the processor 150, the processor 150 would be able to adjust its brightness and position so that a main subject (e.g. human face) and the display information would not be interfered with each other.

Figure 9:
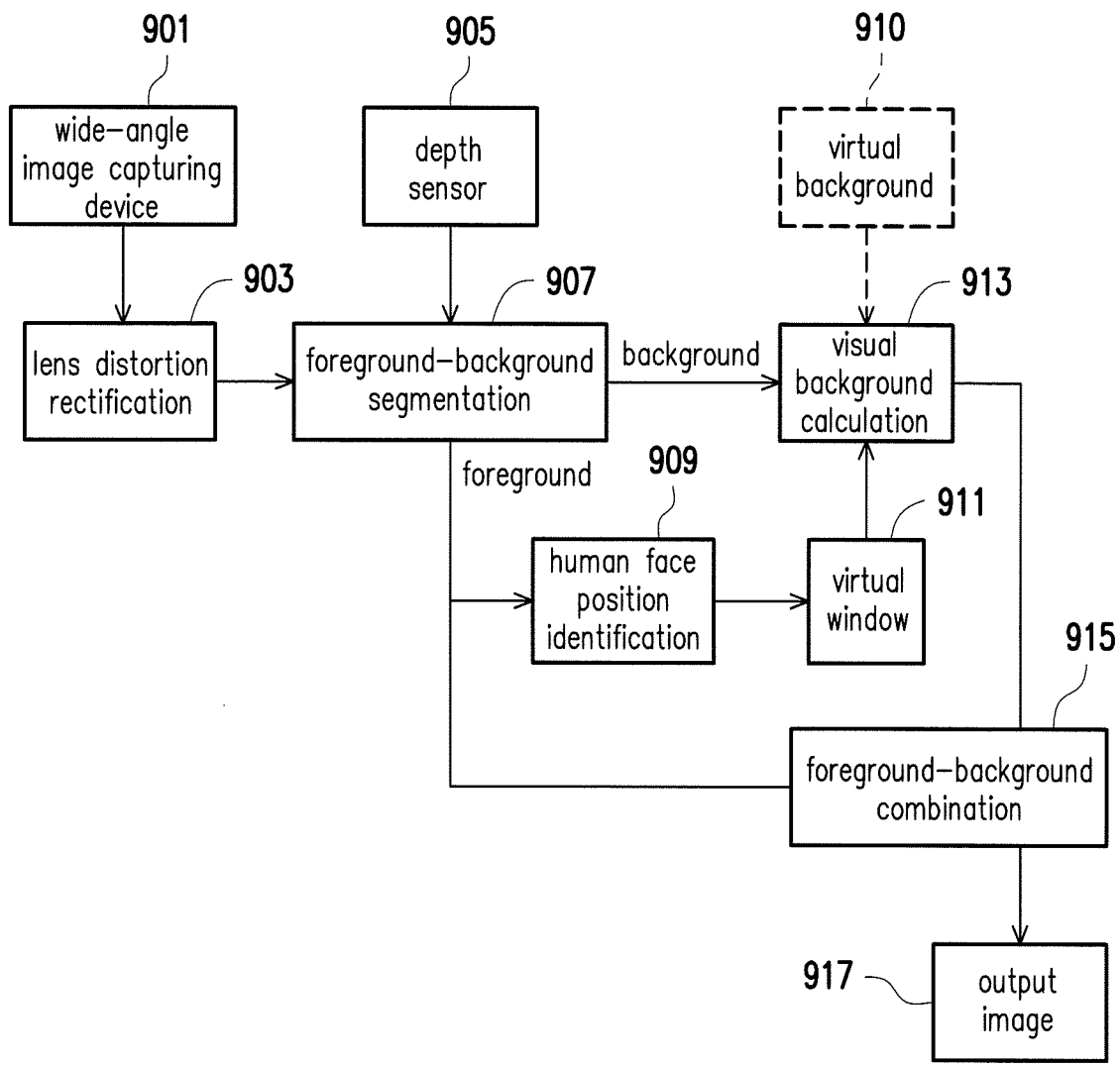
FIG. 9 illustrates a functional flowchart of a display method in accordance with one of the exemplary embodiments of the disclosure.

The aforementioned exemplary embodiments may be integrated as a functional flowchart of a display method as illustrated in FIG. 9 in accordance with one of the exemplary embodiments of the disclosure.

Referring to FIG. 1 and FIG. 9, the display system 100 may perform lens distortion rectification 903 on an image captured by a wide-angle image capturing device 901 to generate a user image. Next, the display system 100 may perform foreground-background segmentation 907 on the user image based on depth information detected by a depth sensor 905. The display system 100 may then perform human face position identification 909 and obtain a virtual window 911, accordingly perform visual background calculation 913 on the background so as to select a background mirror image region from the background and generate a background image. Moreover, the display system 100 may optionally perform visual background calculation 913 by using a virtual background 910 to generate a different background image. Next, the display system 100 may perform background-foreground combination 915 to combine the foreground and the background image into an output image 917 to be displayed. Detailed description on 901-901 may refer to the exemplary embodiments as previously illustrated and may not be repeated hereinafter.

It should be noted that, in an exemplary embodiment, the display system 100 may perform visual background calculation on image contents transmitted from other similar display systems. For example, while the user of the display system 100 is having a video conference with another user of another display system, the display system 100 would receive and display one's image (i.e. another user's image) captured by an image capturing device of another display system. Next, the processor 150 of the display system 100 may also perform visual background calculation similar to that in previous exemplary embodiments on the one's image according to the virtual window and the human face position of the user to generate and display the one's image on the screen 130. Hence, even if the user of the display system 100 changes to a different spot or viewing from a different viewing angle, a different region of the one's image (e.g. a background) would be accordingly displayed on the screen 130 in real time so as to simulate an environment as if the user of the display system 100 were having a conversation with another user in person. Specifically, when the user moves to another spot (e.g. forward, background, to the left, to the right), the user would be able to see an image with a different angle or a different background in the one's environment on the display system 100 as if the user were at the one's environment.

The disclosure also provides a non-transitory computer-readable recording medium, which records computer program composed of a plurality of program instructions (for example, an organization chart, establishing program instruction, a table approving program instruction, a setting program instruction, and a deployment program instruction, and etc.). After these program instructions are loaded into, for example, the processor 150 of the display system 100 and executed by the same, various steps of the aforementioned display method would be accomplished.

In summary, the display method, the system and the computer-readable recording medium thereof proposed in the disclosure calculate and simulate an image as if it were reflected from a mirror by using the image capturing device and the depth sensor so that the image displayed on the screen may attain a mirror effect. Hence, in the disclosure, the brightness of a displayed image would not be affected, and a simulated reflective image is considered as known information where its brightness and the position may be adjusted so that the information to be presented and the simulated reflective image would not be interfered with each other. Moreover, a magical mirror effect with a virtual scene may be attained, and user experiences are thereby greatly increased in the consumer market.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display method, adapted to a display system having an image capturing device, a depth sensor, and a screen, comprising the following steps:

capturing an image of a user in front of a screen by using the image capturing device to generate a user image;

distinguishing a foreground region from a background region in the user image by using the depth sensor;

setting a virtual window on a display area of the screen according to a display size thereof, wherein the virtual window is smaller than the display area of the screen, wherein there exists a scaling ratio between the virtual window and the display area of the screen, wherein the scaling ratio is associated with a predefined viewing position of the user with respect to the screen having a viewing effect as if the user looking at a mirror with a same display size as the screen, wherein a length of the virtual window is a multiplication of the scaling ratio and a length of the screen, wherein a width of the virtual window is a multiplication of the scaling ratio and a width of the screen, wherein the scaling ratio is less than 1, and wherein the predefined viewing position of the user is fixed with respect to a size of the screen;

performing human face detection on the foreground region to obtain plane information of a human face position of the user, and obtaining depth information of the human face position by using the depth sensor;

selecting a background minor image region from the background region according to a size of the virtual window, the plane information and the depth information of the human face position to generate a background image; and combining the foreground region with the background image to generate an output image.

2. The display method according to claim 1, wherein the image capturing device has a wide-angle lens, and wherein the step of capturing the image of the user in front of the screen by using the image capturing device to generate the user image comprises:

performing lens distortion rectification on the image of the user to generate the user image.

3. The display method according to claim 1, wherein the step of distinguishing the foreground region from the background region in the user image by using the depth sensor comprises:

obtaining depth information corresponding to each pixel in the user image by using the depth sensor; and comparing the depth information corresponding to each of the pixels and a predefined depth threshold so as to accordingly determine whether each of the pixels belongs to the background region or the foreground region.

4. The display method according to claim 1, wherein the step of setting the virtual window on the display area of the screen according to the display size thereof comprises:

obtaining an optimum viewing position of the user with respect to the screen;

setting an imaging position of a background with respect to the screen;

obtaining the scaling ratio according to the optimum viewing position and the imaging position; and obtaining the size of the virtual window according to the display size and the scaling ratio.

5. The display method according to claim 1, wherein the step of selecting the background mirror image region from the background region according to the size of the virtual window as well as the plane information and the depth information of the human face position comprises:

calculating a range projected from the human face position, passing through two horizontal endpoints of the virtual window, to a mirror image of the background so as to accordingly select the background mirror image region from the background region.

6. The display method according to claim 1 further comprising:

replacing the background region by a virtual background.

7. The display method according to claim 1, wherein the step of combining the foreground region with the background image to generate the output image comprises:

combining the foreground region with the background image to generate a combined image; and adjusting the combined image to fit the display area of the screen to generate the output image.

8. The display method according to claim 1 further comprising:

display other information on the screen according to a position of the foreground region in the output image.

9. The display method according to claim 1 further comprising:

receiving one's image from another display system; and generating another one's image by using the one's image according to the virtual window, the plane information and the depth information of the human face position.

10. A display system comprising:

an image capturing device, configured to capture images;

a depth sensor, configured to detect depth information;

a screen, configured to display images, wherein the image capturing device and the depth sensor are disposed at a same side as the screen;

a memory, configured to store data; and a processor, coupled to the image capturing device, the depth sensor, the screen, and the memory, and configured to execute the following steps:

capturing an image of a user in front of a screen by using the image capturing device to generate a user image;

distinguishing a foreground region from a background region in the user image by using the depth sensor;

setting a virtual window on a display area of the screen according to a display size thereof, wherein the virtual window is smaller than the display area of the screen, wherein there exists a scaling ratio between the virtual window and the display area of the screen, wherein the scaling ratio is associated with a predefined viewing position of the user with respect to the screen having a viewing effect as if the user looking at a mirror with a same display size as the screen, wherein a length of the virtual window is a multiplication of the scaling ratio and a length of the screen, wherein a width of the virtual window is a multiplication of the scaling ratio and a width of the screen, wherein the scaling ratio is less than 1, and wherein the predefined viewing position of the user is fixed with respect to a size of the screen;

performing human face detection on the foreground region to obtain plane information of a human face position of the user, and obtaining depth information of the human face position by using the depth sensor;

selecting a background mirror image region from the background region according to a size of the virtual window, the plane information and the depth information of the human face position to generate a background image; and combining the foreground region with the background image to generate an output image and displaying the output image on the screen.

11. The display system according to claim 10, wherein the image capturing device has a wide-angle lens, and wherein the processor performs lens distortion rectification on the image of the user to generate the user image.

12. The display system according to claim 10, wherein the processor obtains depth information corresponding to each pixel in the user image by using the depth sensor, and compares the depth information corresponding to each of the pixels and a predefined depth threshold so as to accordingly determine whether each of the pixels belongs to the background region or the foreground region.

13. The display system according to claim 10, wherein the processor obtains an optimum viewing position of the user with respect to the screen, sets an imaging position of a background with respect to the screen, obtains the scaling ratio according to the optimum viewing position and the imaging position, and obtains the size of the virtual window according to the display size and the scaling ratio.

14. The display system according to claim 10, wherein the processor calculates a range projected from the human face position, passing through two horizontal endpoints of the virtual window, to a mirror image of the background so as to accordingly select the background mirror image region from the background region.

15. The display system according to claim 10, wherein the memory further stores a virtual background, and wherein the processor replaces the background region by the virtual background.

16. The display system according to claim 10, wherein the processor combines the foreground region with the background image to generate a combined image and adjust the combined image to fit the display area of the screen to generate the output image.

17. The display system according to claim 10, wherein the processor further displays other information on the screen according to a position of the foreground region in the output image.

18. The display system according to claim 10, wherein the processor further receives one's image from another display system and generates another one's image by using the one's image according to the virtual window, the plane information and the depth information of the human face position.

19. A non-transitory computer-readable recording medium, recording programs to be loaded into a display system to perform steps of:

capturing an image of a user in front of a screen by using the image capturing device to generate a user image;

distinguishing a foreground region from a background region in the user image by using the depth sensor;

setting a virtual window on a display area of the screen according to a display size thereof, wherein the virtual window is smaller than the display area of the screen, wherein there exists a scaling ratio between the virtual window and the display area of the screen, wherein the scaling ratio is associated with a predefined viewing position of the user with respect to the screen having a viewing effect as if the user looking at a mirror with a same display size as the screen, wherein a length of the virtual window is a multiplication of the scaling ratio and a length of the screen, wherein a width of the virtual window is a multiplication of the scaling ratio and a width of the screen, wherein the scaling ratio is less than 1, and wherein the predefined viewing position of the user is fixed with respect to a size of the screen;

performing human face detection on the foreground region to obtain plane information of a human face position of the user, and obtaining depth information of the human face position by using the depth sensor;

selecting a background minor image region from the background region according to a size of the virtual window, the plane information and the depth information of the human face position to generate a background image; and combining the foreground region with the background image to generate an output image.

20. The display method according to claim 1, wherein the scaling ratio is further dependent on an imaging position of the background region.

* * * * *